(12) United States Patent
Carmichael et al.

(10) Patent No.: US 7,789,216 B2
(45) Date of Patent: Sep. 7, 2010

(54) APPARATUS FOR CONVEYING CONTAINERS WITH NON-CIRCULAR CROSS SECTION

(75) Inventors: James Carmichael, Edinburgh (GB); Massimiliano Dalcielo, Rapallo (IT); Marco Ferri, Porto Mantovano (IT)

(73) Assignee: Sidel Holdings & Technology SA, Pully (CH)

( * ) Notice: Subject to any disclaimer, the term of this patent is extended or adjusted under 35 U.S.C. 154(b) by 0 days.

(21) Appl. No.: 12/298,120

(22) PCT Filed: Dec. 20, 2007

(86) PCT No.: PCT/EP2007/064313
§ 371 (c)(1),
(2), (4) Date: Oct. 22, 2008

(87) PCT Pub. No.: WO2008/080873
PCT Pub. Date: Jul. 10, 2008

(65) Prior Publication Data
US 2009/0255781 A1    Oct. 15, 2009

(30) Foreign Application Priority Data
Dec. 29, 2006    (EP)    ................................. 06425885

(51) Int. Cl.
*B65G 47/26*    (2006.01)
(52) U.S. Cl. ...................... 198/450; 198/448
(58) Field of Classification Search ................ 198/448, 198/450, 451, 452
See application file for complete search history.

(56) References Cited

U.S. PATENT DOCUMENTS

| | | | |
|---|---|---|---|
| 2,404,232 A | 7/1946 | Hunter | |
| 2,678,124 A | 5/1954 | Bergmann | |
| 2,801,651 A * | 8/1957 | Street | 198/450 |
| 2,829,757 A | 4/1958 | Breeback | |
| 3,363,632 A * | 1/1968 | Gamberini | 198/450 |
| 3,545,169 A * | 12/1970 | Nash | 198/450 |
| 4,029,195 A | 6/1977 | Hartness et al. | |
| 4,274,533 A * | 6/1981 | Abe | 198/450 |
| 5,501,552 A * | 3/1996 | Simkowski | 198/450 |
| 6,591,967 B1 | 7/2003 | Doudement et al. | |

FOREIGN PATENT DOCUMENTS

JP    11139552 A    5/1999

* cited by examiner

*Primary Examiner*—James R Bidwell
(74) *Attorney, Agent, or Firm*—Pearne & Gordon LLP

(57) ABSTRACT

An apparatus (1) for conveying containers (2) with non circular cross section comprises at least two linear input conveyors (3a, 3b) through which at least two distinct conveyance flows reach the apparatus and a plurality of star conveyors (4a, 4b, 6) for receiving the containers (2) from the linear input conveyors (3a, 3b) and release them in output on a single conveyor (5), with a single output flow. The apparatus comprises at least an oscillating blade (9) and/or a fixed guide (14) in order to guide the containers (2), at an area where multiple flows merge into a single conveyance flow, such as to assure a correct conveyance and orientation of the containers towards the single flow.

10 Claims, 6 Drawing Sheets

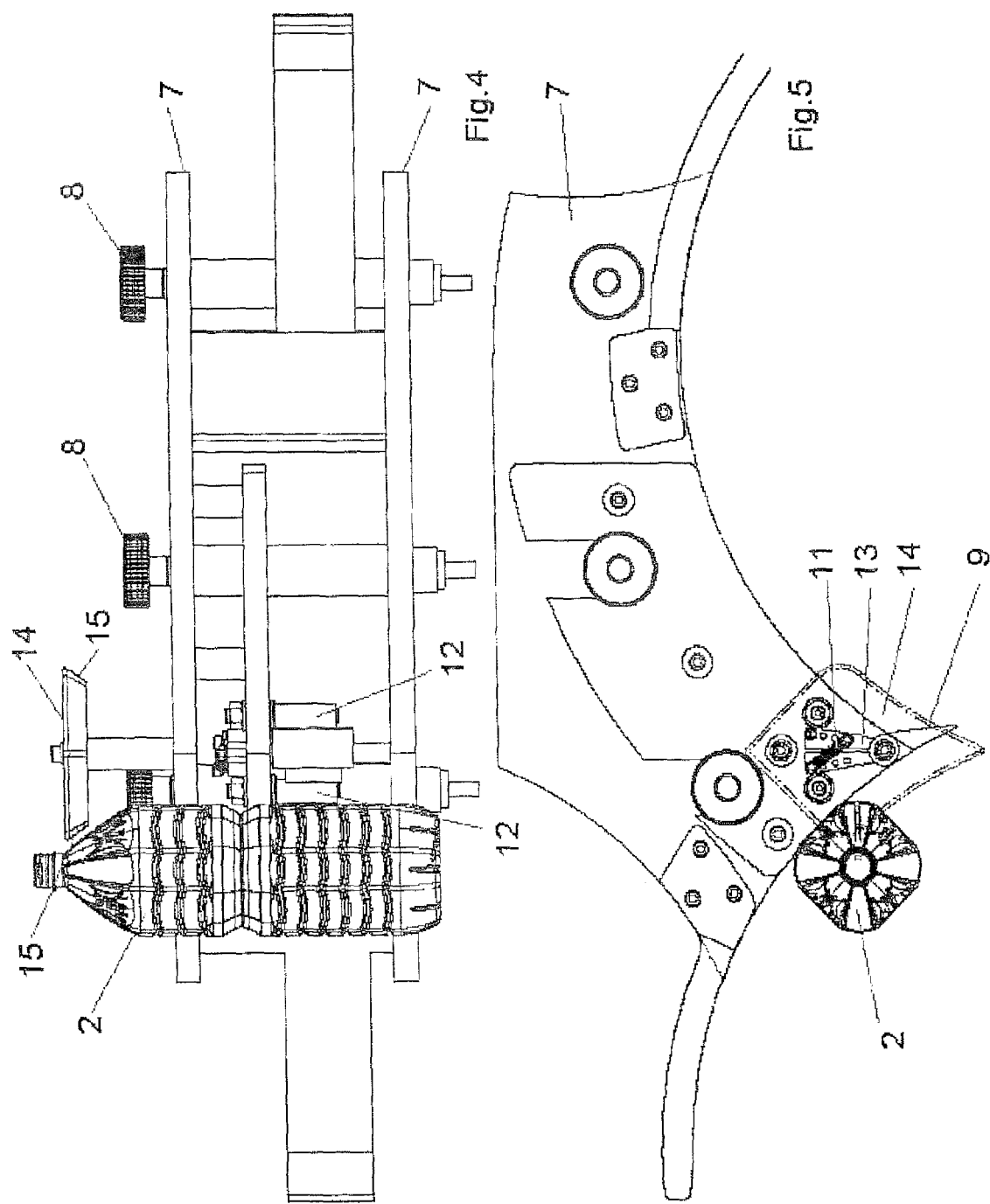

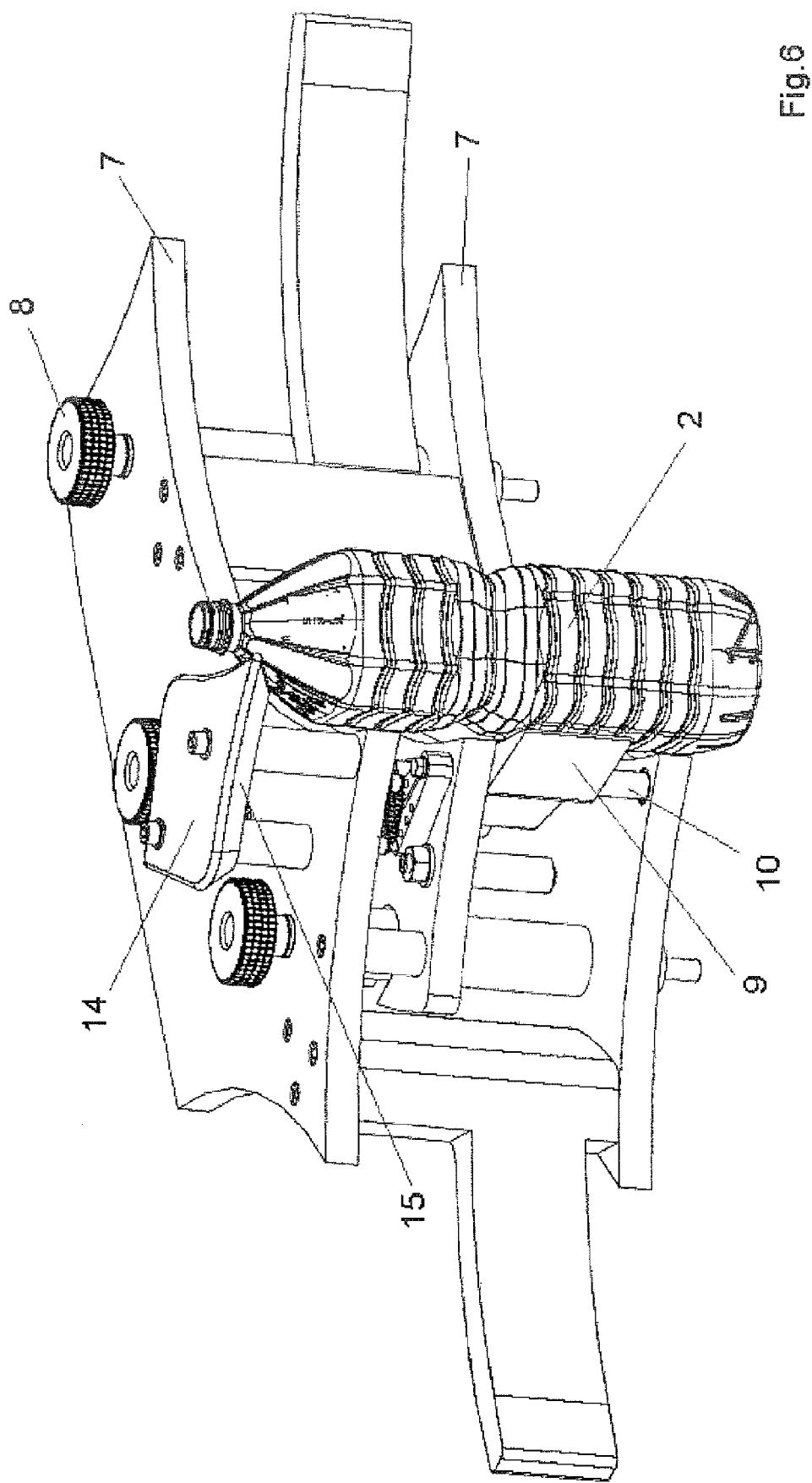

APPARATUS FOR CONVEYING CONTAINERS WITH NON-CIRCULAR CROSS SECTION

TECHNICAL FIELD AND BACKGROUND ART

The present invention relates to an apparatus for conveying containers having non circular cross section.

In particular, the present invention finds application in bottling lines operating on bottles with substantially square cross section.

The apparatus also finds specific but not exclusive application at the input of a labeling machine.

The presence of multi-line conveyors and the need in any case to have ultimately a single flow into the machine (e.g. labeling machine) which has to operate a treatment on the containers, requires the availability of considerable space in plants to allow the reduction from multiple flows to a single flow.

It would therefore be desirable to find a solution that enables to merge the flows within a smaller space.

An additional problems encountered in the prior art is that, when operating on containers whose cross section is not circular but for instance square (i.e. containers for which the orientation and positioning during conveyance is fundamental, above all for the labeling step) there can be problems with the imperfect orientation of the containers, with consequent erroneous positioning of the label thereon.

If star conveyors interacting with each other and counter-rotating were used to merge multiple flows into a single flow of containers, there would be the problem of the shape of the counter-guide, which could not extend too much towards a star conveyor without interfering with the flow of the containers coming from the other one.

The containers would thus be guided only partially and this, when containers with square cross section are involved, for which a correct orientation is essential, is unacceptable, above all when using high conveyance speeds.

DISCLOSURE OF THE INVENTION.

An object of the present invention is to eliminate the aforesaid drawbacks and to make available a particular simple, economical conveyance apparatus that drastically reduces space occupation.

An additional object is to allow a better precision in the conveyance of the containers and a perfect orientation thereof, in particular for the labeling step.

Said objects are fully achieved by the apparatus of the present invention, which is characterised by the content of the claims set out below.

BEST MODE FOR CARRYING OUT THE INVENTION.

This and other characteristics shall become more readily apparent from the following description of a preferred embodiment, illustrated purely by way of non limiting example in the accompanying drawing tables, in which:

FIG. 4 shows a front view of a detail of the apparatus;

FIG. 5 shows a plan view of the detail of FIG. 4;

FIGS. 6 and 7 show two different perspective views of the detail of FIG. 4.

Figure 1:
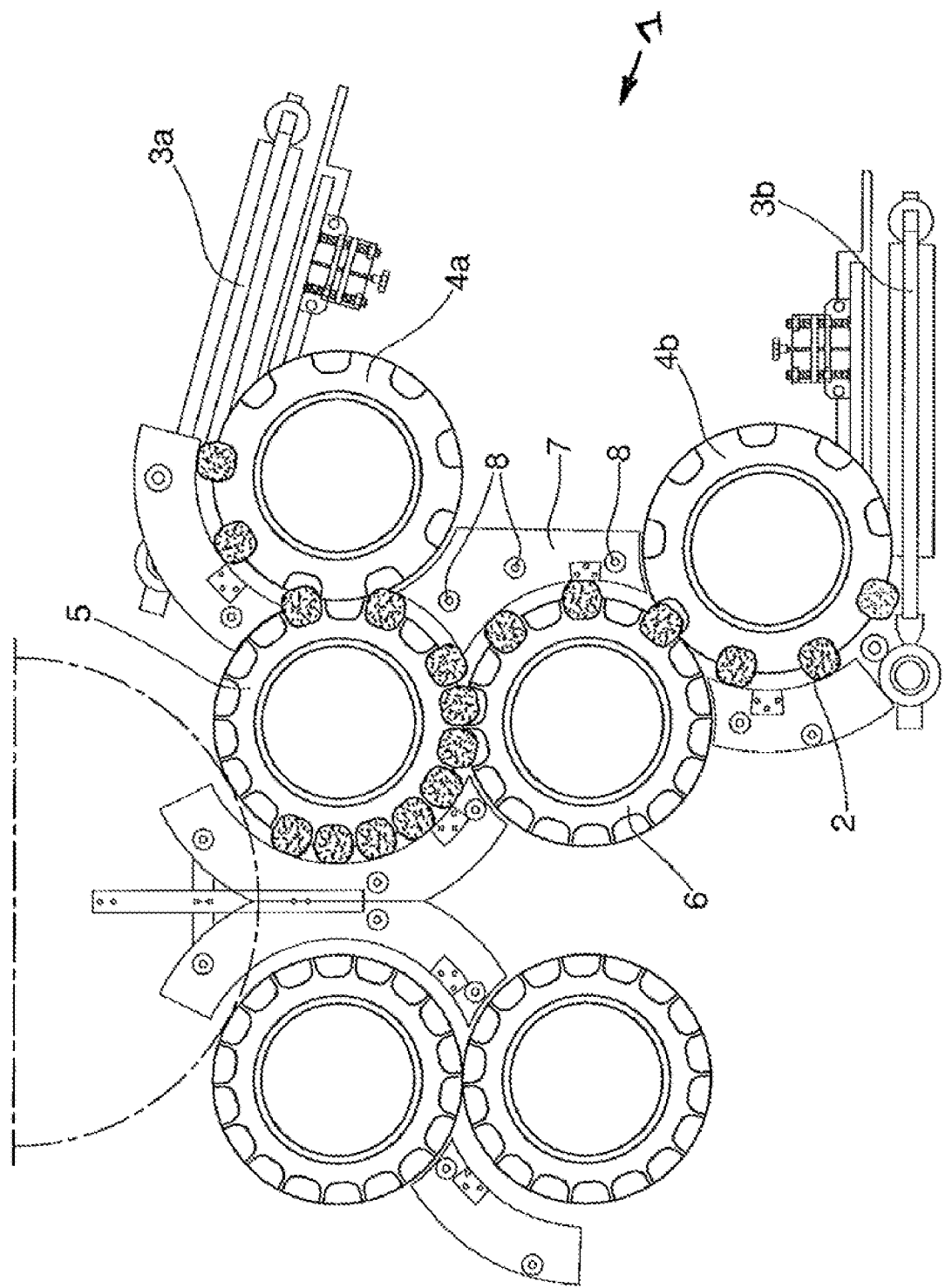
FIG. 1 shows a plan view of the apparatus.
Figure 2:
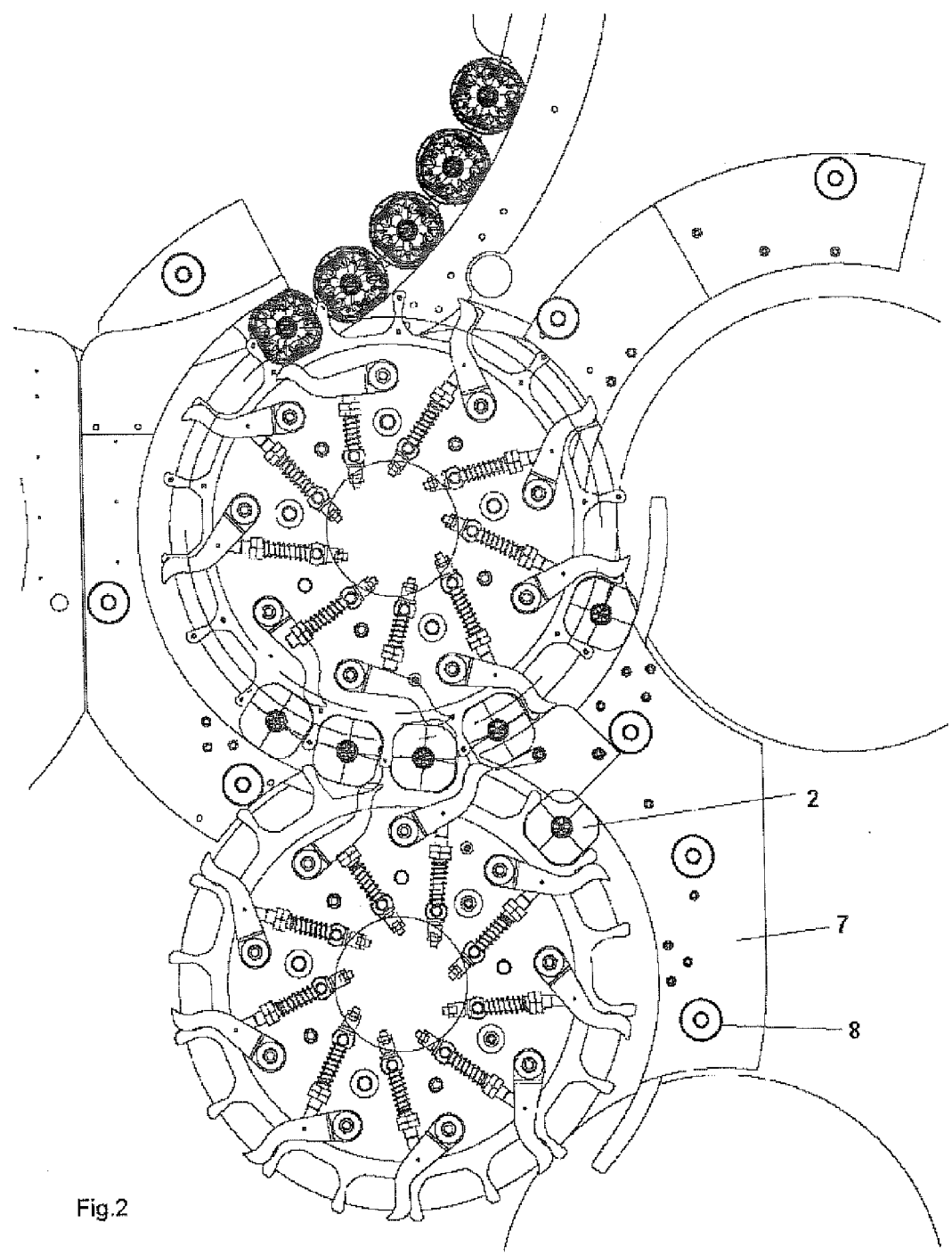
FIG. 2 shows a plan view of a detail of FIG. 1.

With reference to the Figures, the numeral 1 globally designates an apparatus for conveying containers 2, which in the illustrated case are bottles with substantially square cross section.

The apparatus 1 comprises a first input conveyor 3a which through a first input star conveyor 4a feeds the containers to a subsequent star conveyor 5, which in the specific case constitutes the output star conveyor.

The apparatus also comprises a second input conveyor 3b which through a second input star conveyor 4b feeds the containers to an additional star conveyor 6, which in the specific case constitutes the intermediate star conveyor.

A fixed counter-guide 7 constituting a means for guiding the containers 2 by acting on their body and fastened by means of screws 8 and variable according to the formats interacts with the star conveyors 4a, 4b, 5 and 6.

The input star conveyors 4a and 4b have a number n of pits, whereas the output star conveyor 5 has a number 2n of pits, having to receive and unify the two input flows.

The regions where the flows merge is at the confluence between the intermediate star conveyor 6, the output star conveyor 5 and the fixed counter-guide 7.

Figure 3:
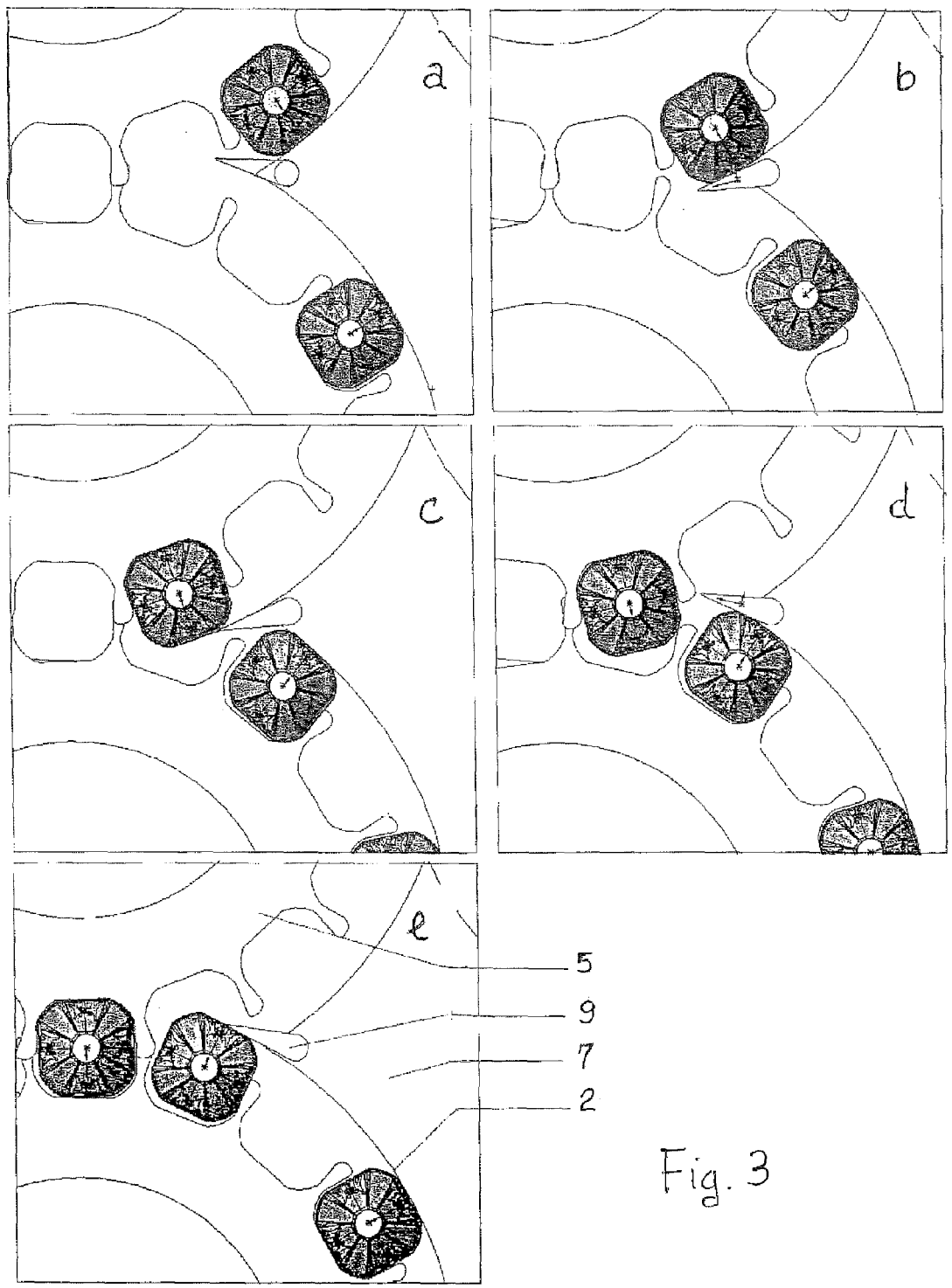
FIG. 3 shows a plan view of, from a) and e), the various steps of advance of the containers in the apparatus.
Figure 7:
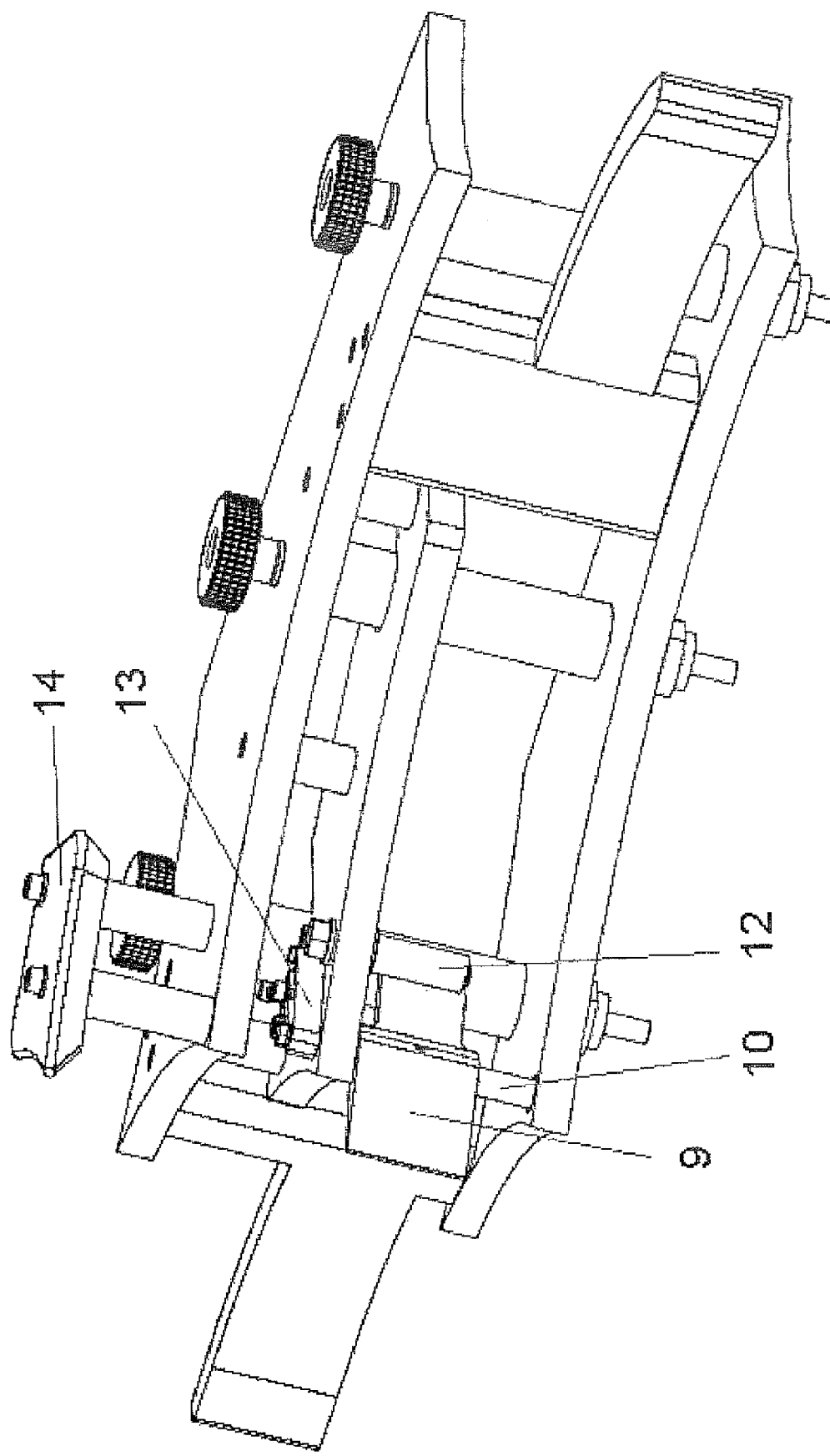

In FIG. 3, the letters a) to e) designate subsequent steps of conveying the containers 2 into the region where the flows merge, where originally is present an oscillating blade 9, shown in greater detail in FIGS. 4 through 7.

The oscillating blade 9 is hinged on a shaft 10 of the counter-guide 7 and it can be free to oscillate between two adjustable mechanical end stops 12 (shown in FIGS. 4 through 7), or, as in the illustrated case, the oscillation is damped by elastic return means 11, constituted in the specific case by a spring.

The end stops 12 are preferably obtained with two steel shafts protected by polyurethane sleeves to dampen the impacts and they are positioned in the rear part of the oscillating blade 9.

The blade, extending also in the rear part, impacts against the end stops and is locked in the correct position for the sliding of the bottle.

There are two jaws 13 made of plastic material, obtained in a single piece and kept closed by the spring 11, which generates a constant force on the jaws that by friction grip the shaft 10 assuring a clutch effect in the two directions of motion.

The spring 11 enables to maintain a constant force independent of the wear of the jaws over time.

According to an embodiment variant, not shown, it is possible to apply a magnetic clutch (with no wear) operating according to the principle of magnetic repulsion.

The oscillation of the oscillating blade 9 is automatically produced by the movement of the containers and the blade is so shaped as to interact with the body of the containers (central-lower region) in proximity to the region where the flows merge into a single flow, thus helping to keep the containers individually guided against the star conveyors.

The oscillating blade 9 is so shaped as to oscillate from a first position in which it interferes with a first flow of containers and a second portion in which it interferes with a second flow of containers.

The oscillating blade is so shaped as to enable the containers to be guided, in the region where multiple flows merge into a single flow, for a path segment greater by at least 40 mm than what would be allowed by the use of only the fixed counter-guide 7 interacting on the median part of the body.

The numeral 14 designates an original fixed guide which in the active has substantially deltoid or goose neck shape and it is so contoured as to interact with the containers in an upper region of their body (preferably on the shoulder, immediately below their projecting collar) and at a section of the apparatus where distinct conveyance flows merge into a single conveyance flow.

The fixed guide 14 has a lateral surface 15 for contact with the containers, so inclined as to interact with a corresponding inclined surface or shoulder of the upper part of the body of the containers 2 to prevent erroneous peripheral and vertical displacements of the containers.

In the illustrated embodiment, the fixed guide comprises two inclined lateral surfaces 15, a first surface interacting with the containers from a first incoming conveying flow and a second surface interacting with the containers from a second incoming conveying flow.

The fixed guide 14 constitutes an upper extension relative to the oscillating blade 9 which protracts to the intersection of the necks of the two flows.

The fixed counter-guide 7, the oscillating blade 9 and the fixed guide 14 constitute means for guiding the containers, at an area where multiple flows merge into a single conveyance flow, so shaped as to assure a correct conveyance and orientation of the containers towards the single flow.

The oscillating blade 9 and the fixed guide 14 can coexist in the apparatus, with the fixed guide 14 preferably positioned coaxially above the oscillating blade 9, or the oscillating blade 9 alone may be present.

The original use of the oscillating blade 9 and possibly of the fixed guide 14 enables to make reliable and safe the conveyance of the containers from multiple flows to a single flow at the confluence between the star conveyors 6 and 5, keeping the orientation of the containers controlled, which is particularly important for the purposes of the subsequent labeling if the containers, as in the specific case, have non circular cross section, and therefore need a precise angular orientation.

The star conveyors used, in combination with the multiple input, also allow the advantage of reducing the bulks necessary to shift from a multi-line flow to a flow on a single conveyance line.

The invention claimed is:

1. Apparatus (1) for conveying containers (2) with non circular cross section, comprising,
    at least two input linear conveyors (3*a*, 3*b*) through which at least two distinct conveyance flows reach the apparatus (1);
    a plurality of star conveyors (4*a*, 4*b*, 6) for receiving the containers from the linear input conveyors (3*a*, 3*b*) and release them in output on a single conveyor (5), with a single output conveyance flow;
    means (7, 9, 14) for guiding the containers (2), at an area where multiple flows merge into a single conveyance flow, shaped in such a way as to assure a correct conveyance and orientation of the containers towards the single flow, said guiding means comprising a guiding oscillating blade (9), whose oscillation is produced automatically by the movement of the containers (2), said blade being so shaped as to interact with the body of the containers in proximity to the merger into a single flow to keep them individually guided and oriented against vanes of the star conveyors, characterized in that the oscillating blade (9) comprises two adjustable mechanical end stops (12) that limit its oscillation.

2. Apparatus as claimed in claim 1, wherein the output conveyor in which the distinct flows merge into a single flow is a star conveyor (5).

3. Apparatus as claimed in claim 1, in which the oscillating blade (9) is clutched by elastic return means (11) or by a magnetic clutch.

4. Apparatus as claimed in claim 3, wherein the elastic return means comprise spring pre-loaded jaws (13).

5. Apparatus as claimed in claim 1, wherein the oscillating blade (9) is so shaped as to oscillate from a first position in which it interferes with a first flow of containers and a second portion in which it interferes with a second flow of containers.

6. Apparatus as claimed in claim 1, wherein the guiding means comprise a fixed guide (14), so shaped as to interact with the containers in an upper region of their body and at a section of the apparatus where distinct conveyance flows merge into a single conveyance flow.

7. Apparatus as claimed in claim 6, wherein the fixed guide (14) has a lateral surface (15) for contact with the containers (2), so inclined as to interact with a corresponding inclined surface or shoulder of the upper part of the body of the containers to prevent erroneous peripheral and vertical displacements of the containers.

8. Apparatus as claimed in claim 6, wherein the fixed guide (14) comprises an active part having deltoid or "goose neck" shape.

9. Apparatus as claimed in claim 6, wherein the fixed guide (14) comprises two inclined lateral surfaces (15), a first surface interacting with the containers from a first incoming conveying flow and a second surface interacting with the containers from a second incoming conveying flow.

10. Apparatus as claimed in claim 6, wherein the fixed guide (14) is coaxially above the oscillating blade (9).

* * * * *